US011906151B2

(12) United States Patent
Jackson, III

(10) Patent No.: US 11,906,151 B2
(45) Date of Patent: Feb. 20, 2024

(54) LUMINOUS BOTTLE

(71) Applicant: Sire Spirits, LLC, Hoboken, NJ (US)

(72) Inventor: Curtis J. Jackson, III, Hoboken, NJ (US)

(73) Assignee: Sire Spirits, LLC, Hoboken, NJ (US)

( * ) Notice: Subject to any disclaimer, the term of this patent is extended or adjusted under 35 U.S.C. 154(b) by 0 days.

(21) Appl. No.: 18/105,526

(22) Filed: Feb. 3, 2023

(65) Prior Publication Data

US 2023/0243498 A1 Aug. 3, 2023

Related U.S. Application Data

(60) Provisional application No. 63/306,325, filed on Feb. 3, 2022.

(51) Int. Cl.
*F21V 33/00* (2006.01)
*B65D 1/02* (2006.01)
*F21Y 115/10* (2016.01)

(52) U.S. Cl.
CPC ............ *F21V 33/00* (2013.01); *B65D 1/0207* (2013.01); *B65D 2203/00* (2013.01); *F21Y 2115/10* (2016.08)

(58) Field of Classification Search
CPC . B65D 2203/00; B65D 1/02–08; F21V 33/00; F21Y 2115/10
See application file for complete search history.

(56) References Cited

U.S. PATENT DOCUMENTS 5,785,407 A 7/1998 Ratcliffe et al.
10,215,396 B2 2/2019 Willows et al.
10,386,054 B2 * 8/2019 Ige .......................... F21V 23/06
(Continued)

FOREIGN PATENT DOCUMENTS

CN 202208399 U 5/2012
CN 202208420 U 5/2012
(Continued)

OTHER PUBLICATIONS

Mark Jessen, Jan. 19, 2017, "Dom Perignon's Luminous Glowing Bottle", published on "https://manofmany.com/lifestyle/whats-deal-dom-perignons-luminous-glowing-bottle".
(Continued)

*Primary Examiner* — Anh Q Tran
(74) *Attorney, Agent, or Firm* — Blank Rome LLP

(57) ABSTRACT

A luminous bottle is disclosed herein. In particular, the luminous bottle may comprise a bottle containing a volume configured to receive liquids, solids, any type of substance, or a combination thereof. For example, in certain embodiments, the luminous bottle may be configured to store consumable beverages, such as, but not limited to, champagne, wine, liquor, beer, soda, water, and/or other types of consumable beverages. The luminous bottle may include a base portion including a recessed portion, a luminous pad configured to adhere to a surface of the luminous bottle and configured to output light, an ornamental component attachable to the bottle and configured to secure onto the luminous pad, and a power compartment configured to secure within the recessed portion of the base portion. The power compartment may include a switch, which, when activated, may cause the luminous pad to emit light.

20 Claims, 11 Drawing Sheets

(56) References Cited

U.S. PATENT DOCUMENTS

| | | | | |
|---|---|---|---|---|
| 2006/0139928 | A1* | 6/2006 | Griffiths ............. | F21V 33/0028 362/276 |
| 2007/0206372 | A1 | 9/2007 | Casillas | |
| 2008/0035515 | A1* | 2/2008 | Dikopf .................. | B65D 23/00 362/653 |
| 2011/0096532 | A1 | 4/2011 | Brinson | |
| 2013/0259984 | A1 | 10/2013 | Eves | |
| 2015/0211729 | A1 | 7/2015 | Mahlmeister et al. | |

FOREIGN PATENT DOCUMENTS

| | | | | | |
|---|---|---|---|---|---|
| CN | 207141694 | U | * | 3/2018 | |
| CN | 207141694 | U | | 3/2018 | |
| CN | 208484979 | U | | 2/2019 | |
| CN | 213030109 | U | | 4/2021 | |
| EM | 008323877-0003 | | | 12/2020 | |
| EM | 008323877-0004 | | | 12/2020 | |
| EM | 008323877-0005 | | | 12/2020 | |
| EM | 008323877-0006 | | | 12/2020 | |
| EM | 008323877-0007 | | | 12/2020 | |
| EM | 008323877-0008 | | | 12/2020 | |
| EM | 008323877-0009 | | | 12/2020 | |
| EM | 008323877-0010 | | | 12/2020 | |
| FR | 3002208 | A3 | * | 8/2014 | ............... B65D 1/02 |
| WO | 2014064135 | A1 | | 5/2014 | |

OTHER PUBLICATIONS

International Search Report; International Application No. PCT/US2023/012325; International Filing Date: Feb. 3, 2023; 2 pages.
Written Opinion; International Application No. PCT/US2023/012325; International Filing Date: Feb. 3, 2023; 6 pages.

* cited by examiner

LUMINOUS BOTTLE

CROSS-REFERENCE TO RELATED APPLICATION

The present application claims the benefit of U.S. Provisional Patent Application No. 63/306,325, filed Feb. 3, 2022, the entirety of which is incorporated herein.

FIELD OF THE INVENTION

The present application relates to bottle technologies, lighting technologies, beverage technologies, labeling technologies, and more particularly, to a luminous bottle configured to output light for visual perception by a user.

BACKGROUND

Currently, the beverage industry has been undergoing rapid advancement and has been increasingly embracing different types of technology and techniques in terms of marketing its products to enhance customer retention and also to attract new customers. For example, the beverage industry has come up with new formulations and flavors for beverages, new types of visually-attractive labels and bottles, and innovative marketing paraphernalia to assist in accomplishing such endeavors. While current technologies and techniques provide for certain benefits in this regard, such technologies and techniques can be substantially improved and enhanced. In particular, current technologies may be improved so as to provide enhanced visual attractiveness to a consumer such that the consumer develops not only a favorable impression of a beverage and its accompanying bottle, but also to the beverage contained therein. Such enhancements and improvements to methodologies and technologies may provide for improved customer retention, enhanced attraction of new customers, improved results, and increased engagement with consumers.

SUMMARY

One or more embodiments of a luminous bottle is provided. In particular, the luminous bottle may include a volume configured to receive liquids, solids, any type of substance, or a combination thereof. For example, in certain embodiments, the luminous bottle may be configured to store consumable beverages, such as, but not limited to, champagne, wine, liquor, beer, soda, water, other types of consumable beverages, or a combination thereof. The luminous bottle may include a base portion including a recessed portion, a luminous pad configured to adhere to a surface of the luminous bottle and configured to output light, an ornamental component attachable to the bottle and configured to secure onto the luminous pad, and a power compartment configured to secure within the recessed portion of the base portion. The power compartment may include a switch, which, when activated, may cause the luminous pad to emit light in a manner that is visually attractive to a potential consumer of the beverage contained in the luminous bottle.

In an embodiment, a luminous bottle is disclosed. The luminous bottle may include a volume configured to receive a consumable beverage. Additionally, the luminous bottle may include a securable opening located on a portion of the luminous bottle. In certain embodiments, the consumable beverage is pourable through the opening such that the consumable beverage is contained within the volume of the luminous bottle when the consumable beverage is poured through the opening. The luminous bottle may also include a base portion including a recessed portion. The luminous bottle may also include a luminous pad configured to adhere to a surface of the luminous bottle and configured to output light. Furthermore, the luminous bottle may include an ornamental component attachable to the luminous bottle and configured to secure onto a portion of the luminous pad. Moreover, the luminous bottle may include a power compartment configured to secure within the recessed portion. In certain embodiments, the power compartment may include a power source configured to deliver power to the luminous pad such that when a switch of the power compartment is activated, the luminous pad emits light.

In an embodiment, a method for utilizing a luminous bottle is disclosed. The method may include providing a luminous bottle containing a consumable beverage for consumption by a user. Additionally, the method may include activating a switch of the luminous bottle to deliver power to a luminous pad of the bottle. The method may then include, after the activation, outputting light via the luminous pad of the luminous bottle to illuminate the luminous bottle. When the luminous bottle is done being used or at any other desired time, the method may include deactivating the switch of the luminous bottle. Furthermore, the method may include ceasing output of the light via the luminous pad of the luminous bottle.

In an embodiment, another version of a luminous bottle is disclosed. The luminous bottle may include a securable opening located on a portion of the bottle. The consumable beverage may be pourable through the opening such that the consumable beverage is contained within a volume of the bottle when the consumable beverage is poured through the opening. Additionally, the luminous bottle may include a luminous pad configured to adhere to a surface of the bottle and configured to output light. Furthermore, the luminous bottle may include an ornamental component attachable to the bottle and configured to secure onto a portion of the luminous pad. Still further, the luminous bottle may include a power compartment configured to secure within a recessed portion of the bottle, wherein the power compartment includes a power source configured to deliver power to the luminous pad such that when a switch of the power compartment is activated, the luminous pad emits light.

These and other features of a luminous bottle and accompanying methods are described in the following detailed description, drawings, and appended claims.

DETAILED DESCRIPTION

A plurality of embodiments of a luminous bottle 100 are disclosed herein. In particular, the luminous bottle may include a volume configured to receive liquids, solids, any type of substance, or a combination thereof. In certain embodiments, the luminous bottle may be configured to store consumable beverages, such as, but not limited to, champagne, wine, liquor, beer, soda, water, other types of consumable beverages, or a combination thereof. The luminous bottle may include a base portion including a recessed portion, a luminous pad configured to adhere to a surface of the luminous bottle and configured to output light, an ornamental component attachable to the bottle and configured to secure onto the luminous pad, and a power compartment configured to secure within the recessed portion of the base portion. The power compartment may include a power source and a switch, which, when activated, may deliver power to the luminous pad and cause the luminous pad to emit light in a manner that is visually attractive to a potential consumer of the beverage contained in the luminous bottle. When the switch is deactivated, the luminous pad may be configured to cease emitting light.

Figure 9:
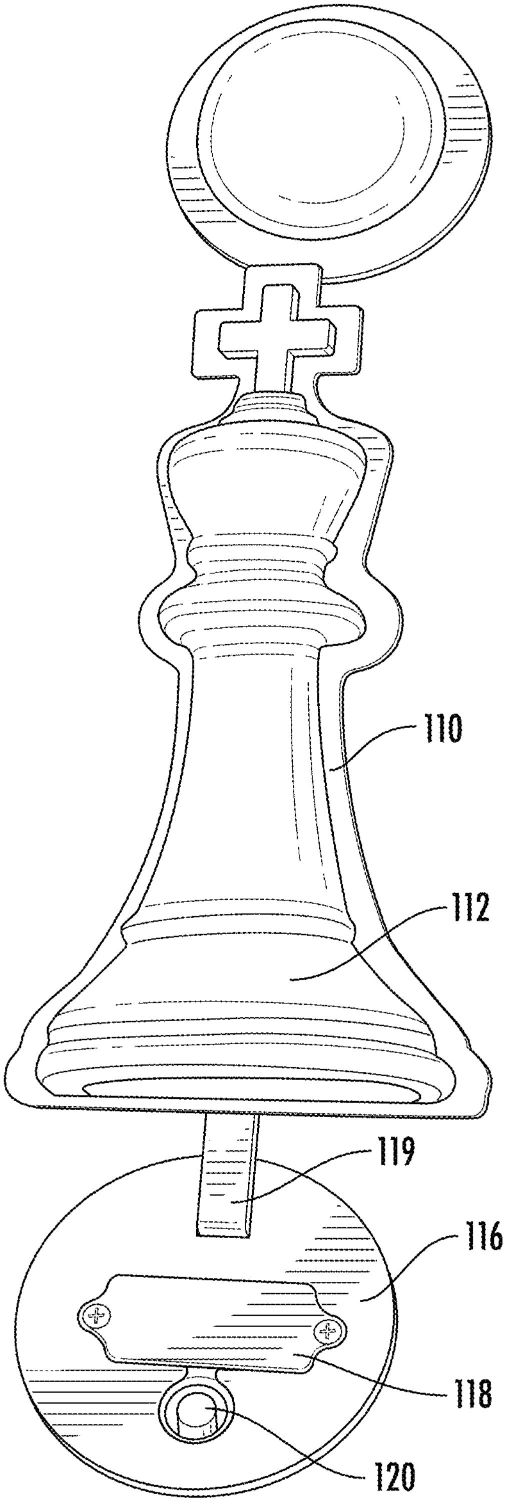
FIG. 9 is a schematic diagram illustrating a luminous pad, an ornamental component, and a power compartment of a luminous bottle according to an embodiment of the present disclosure.
Figure 10:
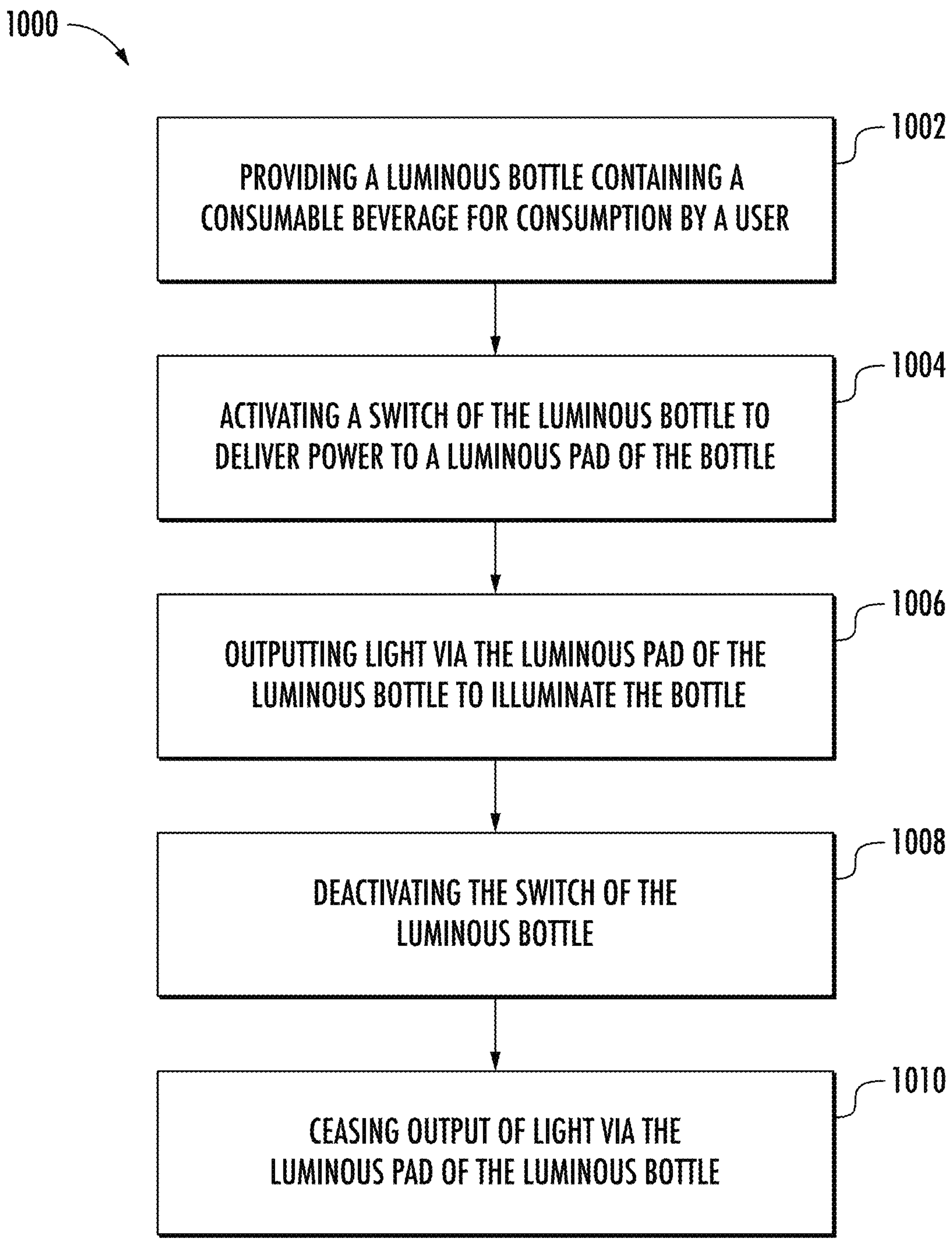
FIG. 10 is a flow diagram illustrating a sample method for using a luminous bottle according to an embodiment of the present disclosure.

In certain embodiments, the luminous pad, the ornamental component, and the power compartment may be configured to be attachable together such that the luminous pad, the ornamental component, and the power compartment are attachable and/or detachable from the bottle as a unit (e.g., as shown in FIG. 9). In certain embodiments, the luminous pad, the ornamental component, and/or the power compartment may include any number of sensors, memories, processors, communication modules, and/or other componentry. For example, the ornamental component may house a sensor configured to detect ambient light occurring in an environment in which the bottle is located, acoustic signals and/or audio content occurring in the environment, and/or any other detectable information from the environment and/or the bottle itself to adjust a manner in which the light is emitted via the luminous pad of the luminous bottle. In certain embodiments, the luminous pad, the ornamental component, and/or the power compartment may include any number of light emitting diodes, polyethylene terephthalate, polyvinyl chloride, translucent plastic, fluorophores, esters, electron-rich dyes, or a combination thereof. In certain embodiments, the luminous pad, the ornamental component, and/or the power compartment may include any number of light emitting diodes, polyethylene terephthalate, polyvinyl chloride, translucent plastic, fluorophores, esters, electron-rich dyes, or a combination thereof. In certain embodiments, different luminous pads, ornamental components, and/or power compartments of varying shapes, sizes, and/or light configurations may be incorporated with the luminous bottle depending on the desired visual effect.

Figure 1:
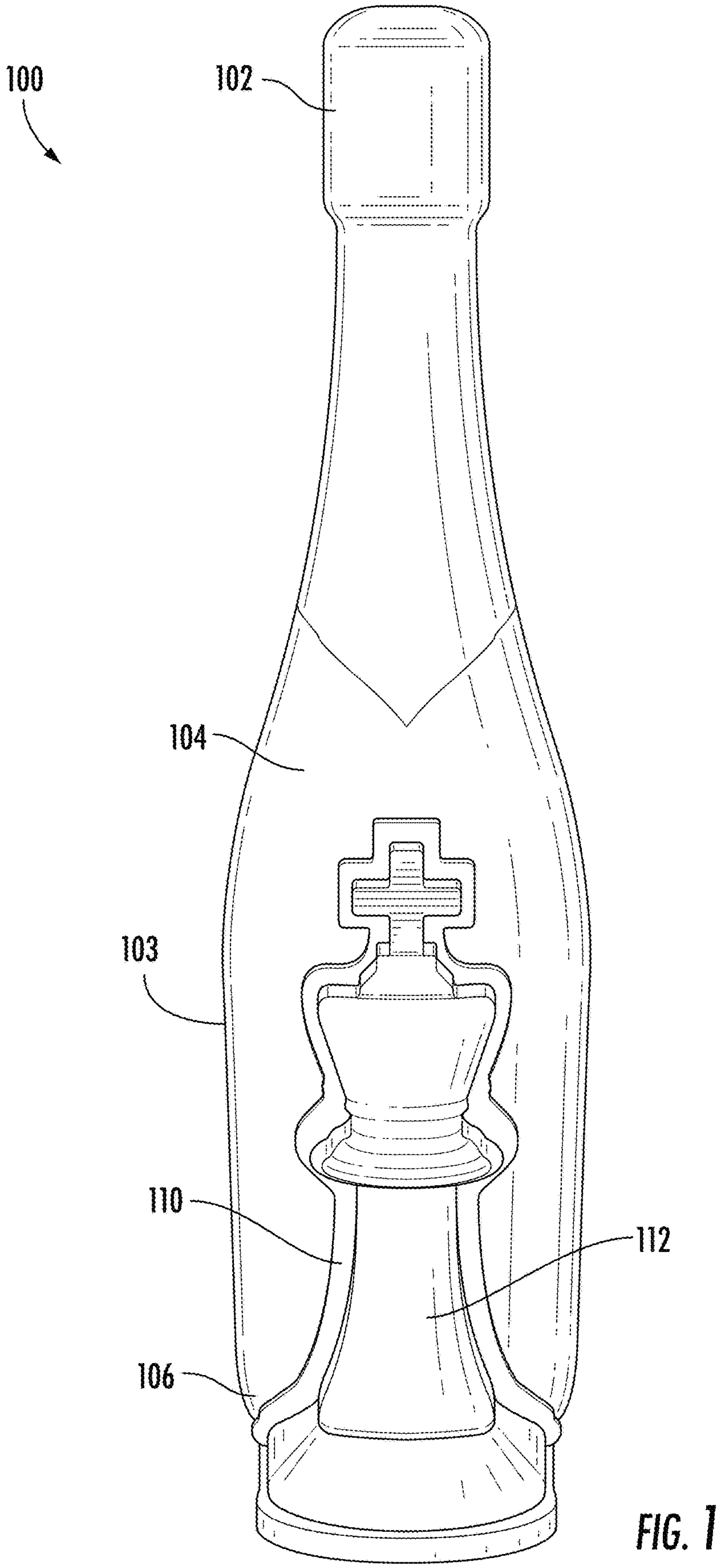
FIG. 1 is a schematic diagram of a front view of a luminous bottle according to an embodiment of the present disclosure.
Figure 2:
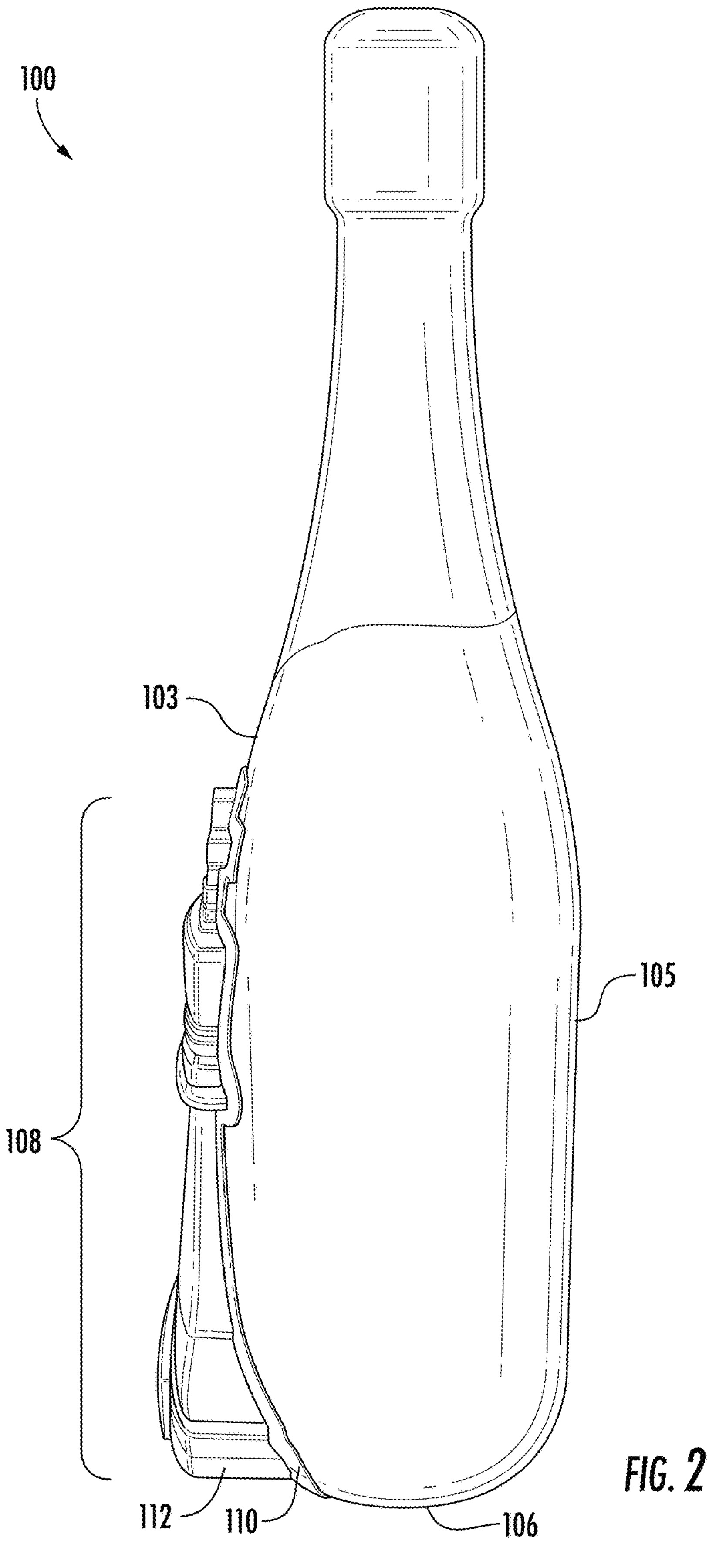
FIG. 2 is a schematic diagram of a front side view of a luminous bottle according to an embodiment of the present disclosure.
Figure 3:
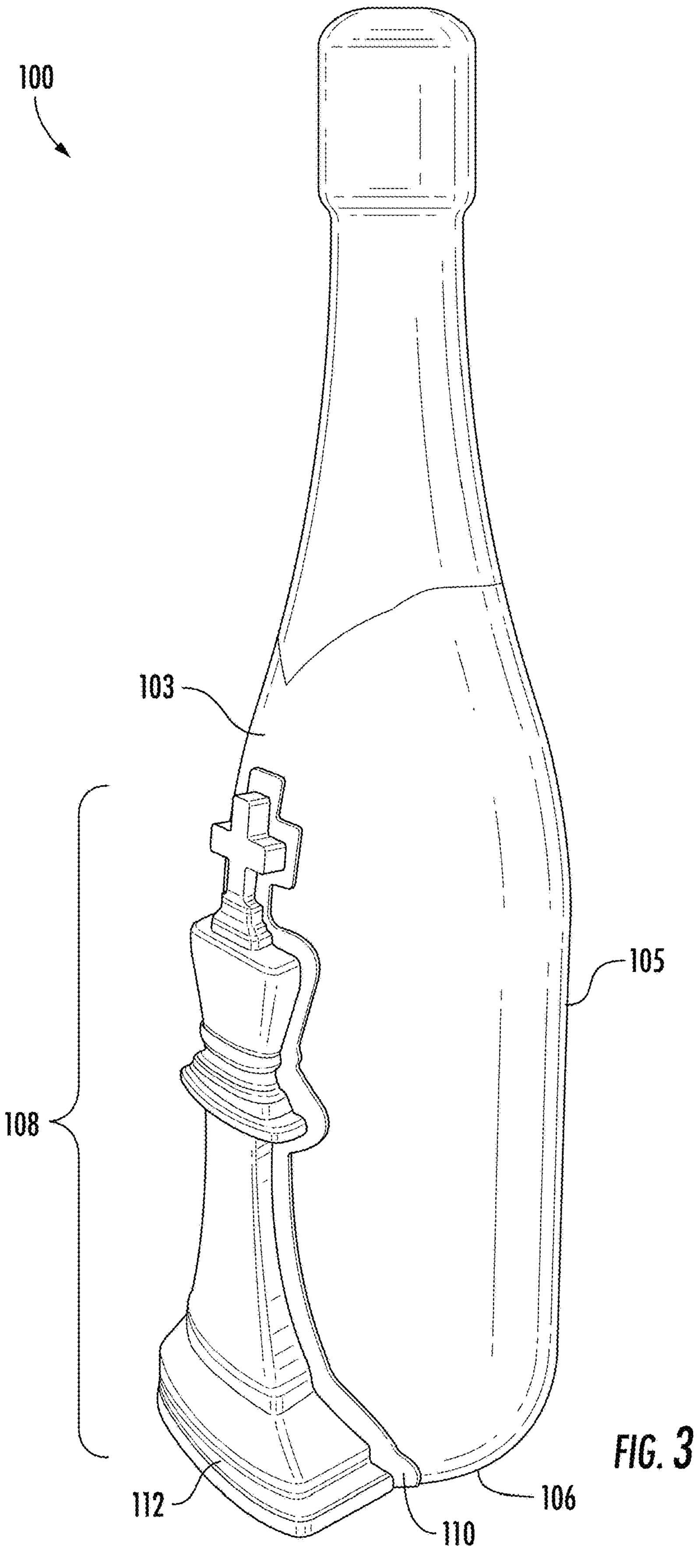
FIG. 3 is a schematic diagram of an angled perspective view of a luminous bottle according to an embodiment of the present disclosure.
Figure 4:
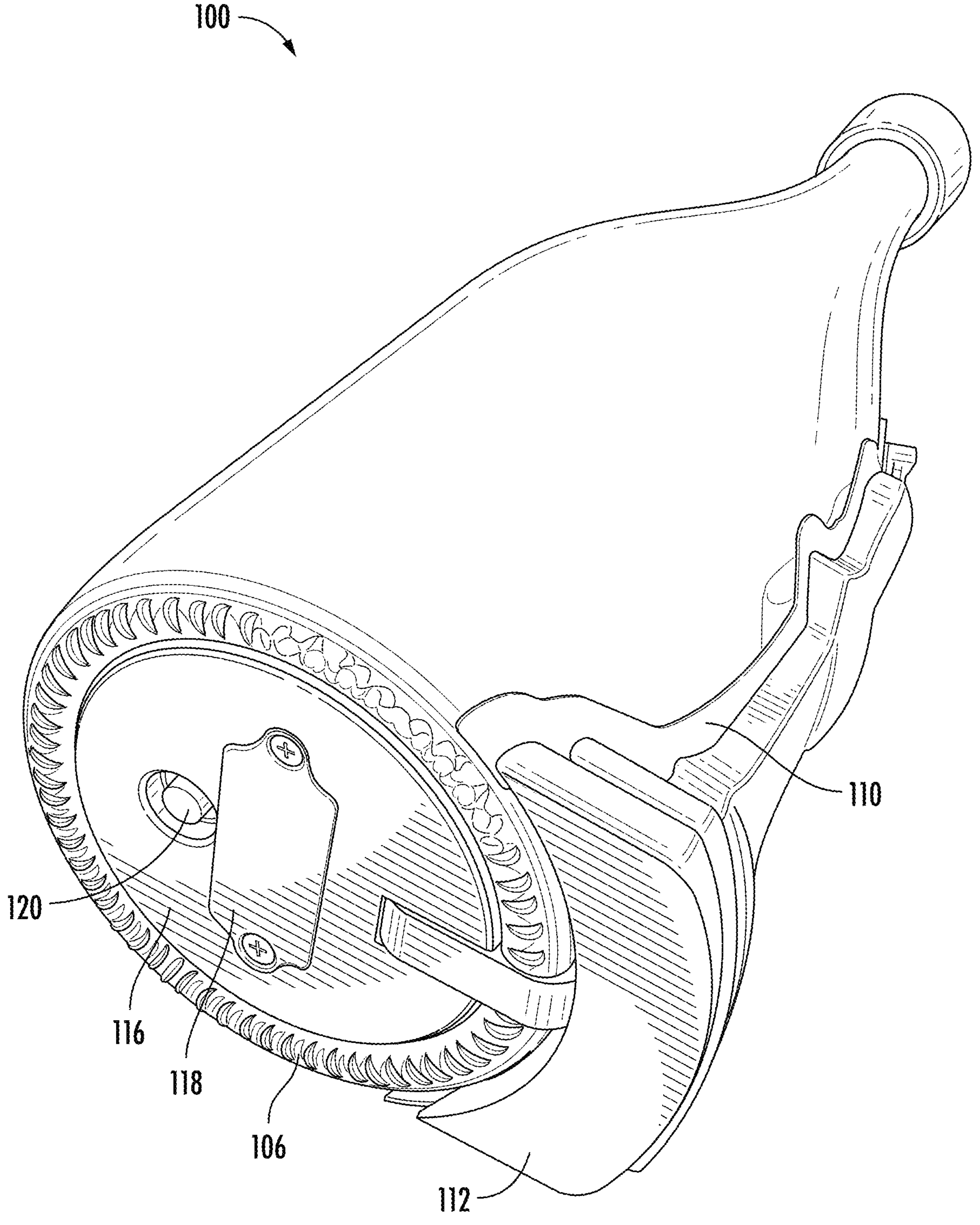
FIG. 4 is a schematic diagram of an angled bottom view of a luminous bottle according to an embodiment of the present disclosure.
Figure 5:
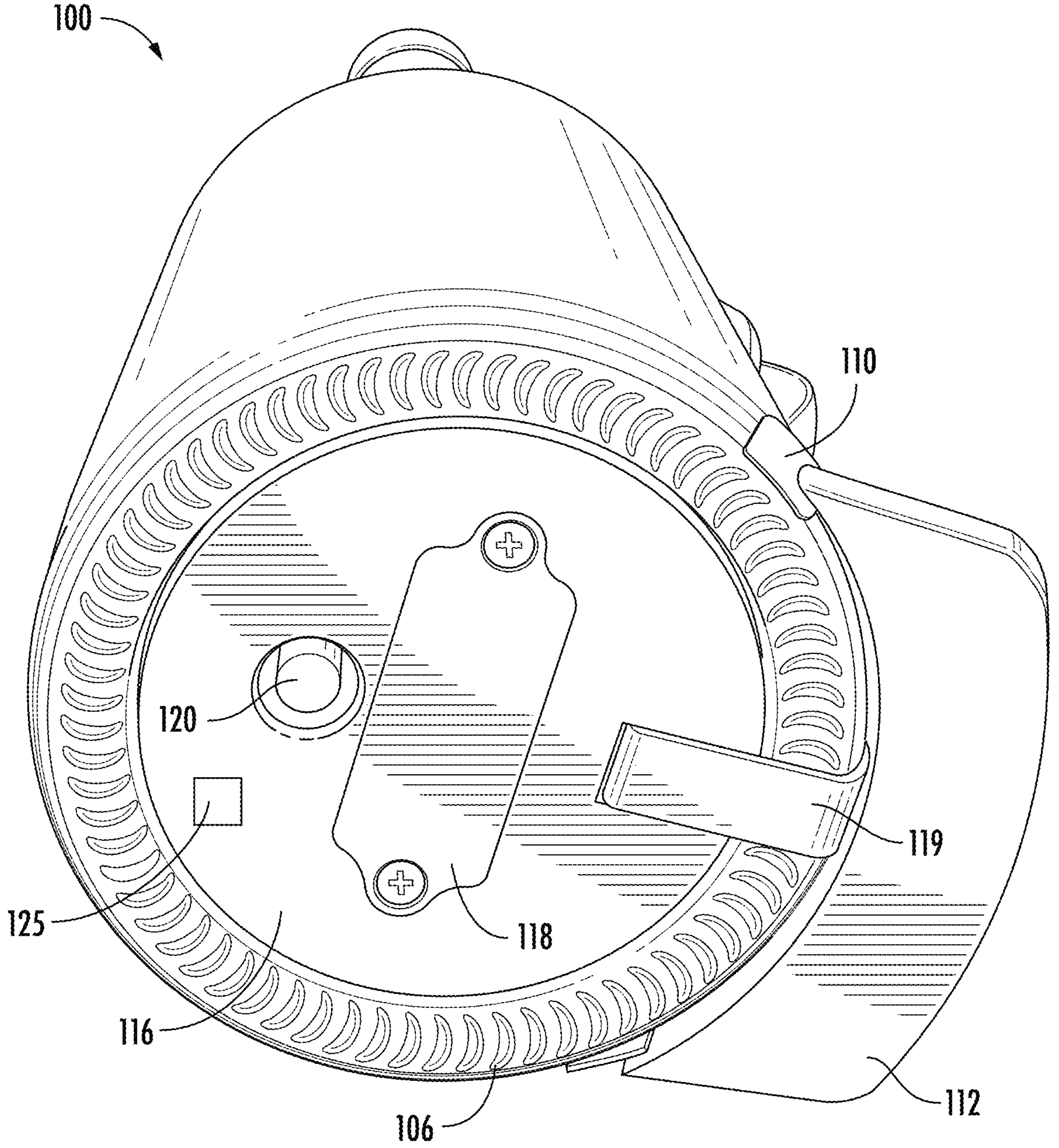
FIG. 5 is a schematic diagram of a bottom view of a luminous bottle according to an embodiment of the present disclosure.
Figure 6:
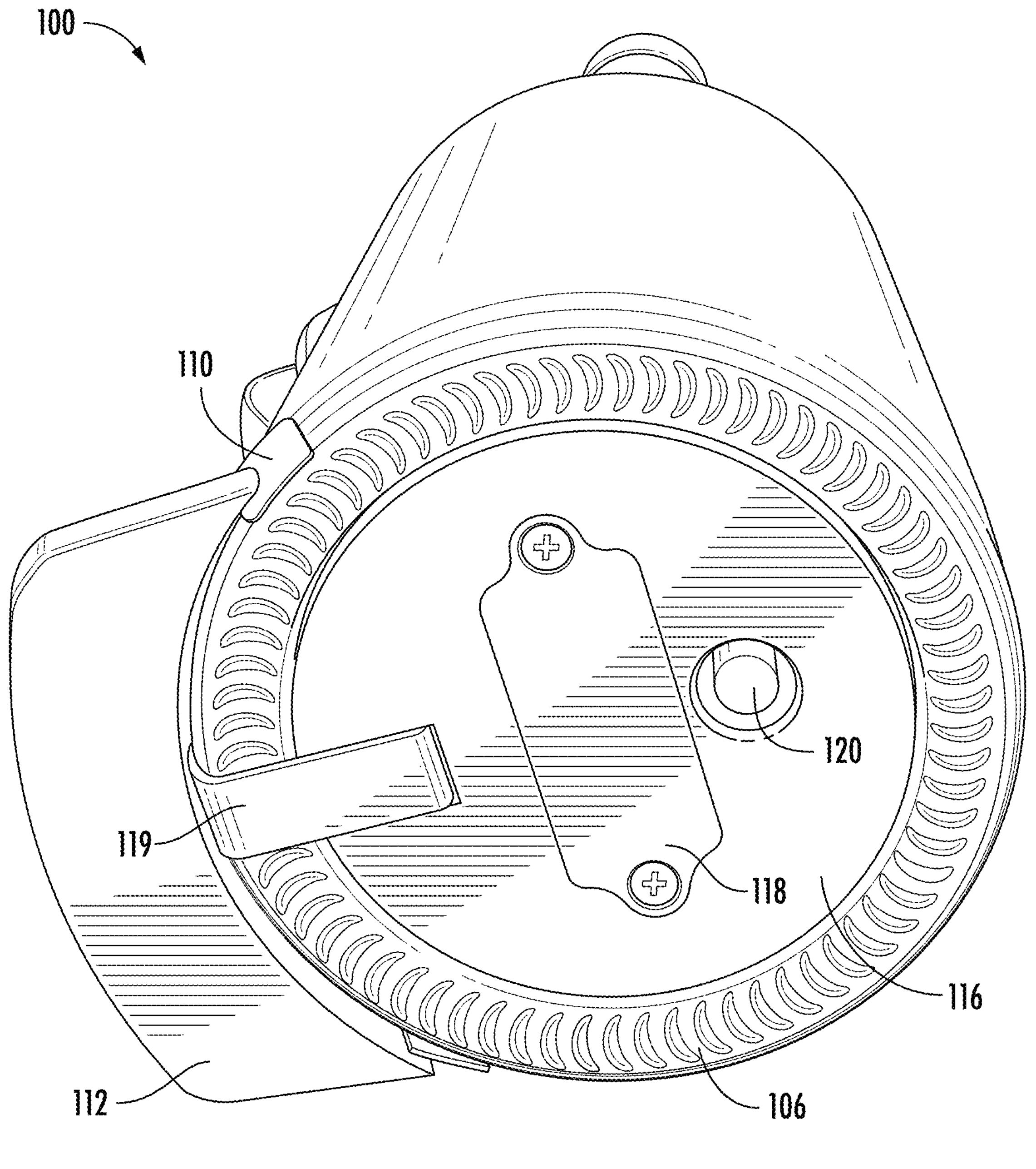
FIG. 6 is a schematic diagram of an angled bottom view of a luminous bottle according to an embodiment of the present disclosure.
Figure 7:
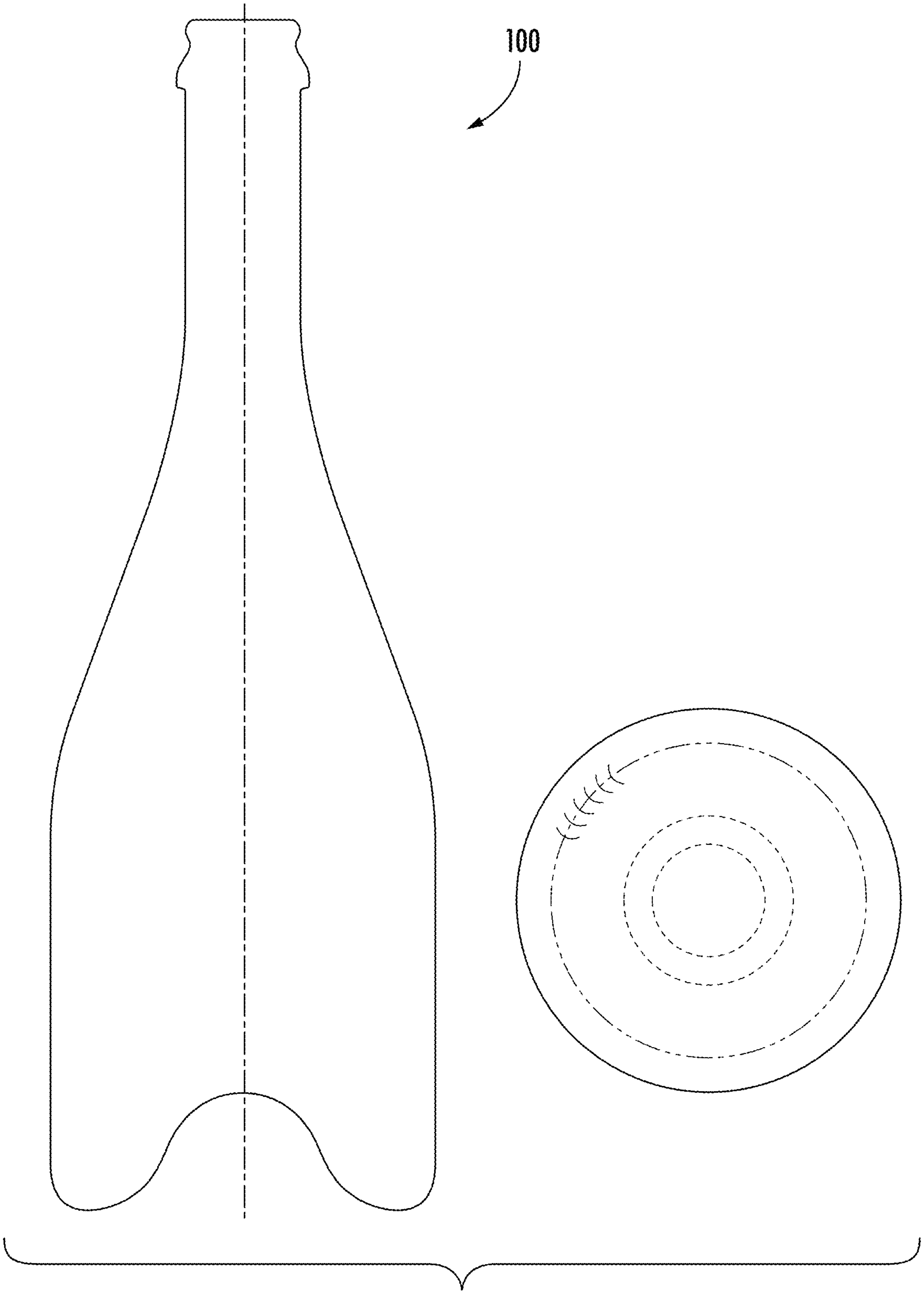
FIG. 7 is a schematic diagram illustrating a luminous bottle including a recessed portion and a bottom portion of the bottle according to an embodiment of the present disclosure.
Figure 8:
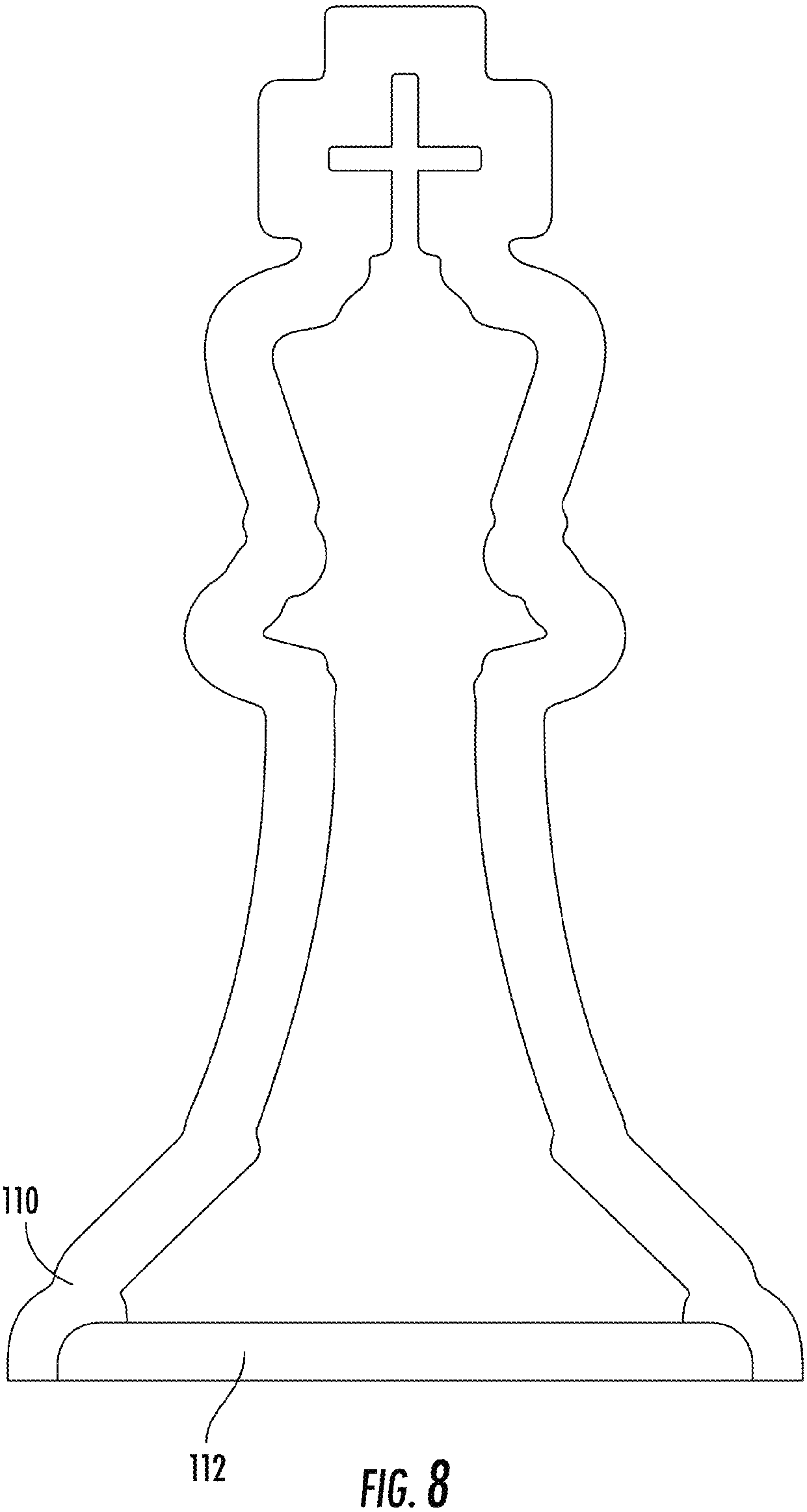
FIG. 8 is a schematic diagram illustrating a luminous pad and ornamental component for use with a luminous bottle according to an embodiment of the present disclosure.

As shown in FIG. 1 and referring also to FIGS. 1-9, a luminous bottle 100 for producing and providing a visually-attractive light effect is disclosed. Notably, in certain embodiments, the luminous bottle 100 may include any number of features and/or componentry. For example, in certain embodiments and as illustratively shown in FIGS. 1-9, the luminous bottle 100 may include an opening 102, a front portion 103, a volume 104, a back portion 105, a base portion 106, a recessed portion 107 (e.g., as shown in FIG. 7), an ornamental component/luminous pad unit 108, a luminous pad 110, an ornamental component 112, a power compartment 116, a receptacle 118 (and accompanying cover) for housing a power source, an electrical wire 119, a switch 120, and/or any number of additional componentry 125.

The luminous bottle 100 itself may be made of glass, plastic, metal, and/or any other substance, which may be shaped and molded for storage of liquids, solids, and/or other substances. In a preferred embodiment, the luminous bottle 100 may be made of glass. The opening 102 may be an opening configured to allow substances (e.g., a beverage) to be poured into or poured out of the luminous bottle 100. In certain embodiments, the opening 102 may be secured and sealed, such as by utilizing a cap, a cork, or other sealing mechanism to facilitate retention of any contents stored within the volume 104 of the luminous bottle 100. The front portion 103 of the luminous bottle 100 may be a desired location on which the ornamental component/luminous pad unit 108 may be attached, as shown in FIGS. 1-9. The volume 104 may be sized and shaped depending on preference and may generally have a shape correlating with the shape of the bottle 100 itself. In certain embodiments, the volume 104 may have any desired shape and any number of volumes 104 may be included within the luminous bottle 100.

The back portion 105 of the luminous bottle 100 may be configured to be bare, however, in certain embodiments, one or more ornamental component/luminous pad units 108 (and/or separate luminous pads 110) may be attached onto a surface of the back portion 105 to provide further lighting effects for the luminous bottle 100. In certain embodiments, such as when the back portion 105 is bare and when the luminous pad 110 is activated, a consumer may view a lighted silhouette of the luminous pad 110 by viewing through the pack portion 105 of the luminous bottle 100. The base portion 106 of the luminous bottle 100 may be configured to have a recessed portion 107 (e.g. as shown in FIG. 7). The recessed portion 107 may have any desired shape and dimensions. In certain embodiments, the shape and dimensions of the recessed portion 107 may be such that the power compartment 116 may be fit and secured entirely (or mostly) within the recessed portion 107 to facilitate concealment of the power compartment 116 from the view of a user viewing the luminous bottle 100 right side up.

The recessed portion 107 may be configured to retain power compartment 116. The power compartment 116 may create a seal with base portion 106. The seal may be a physical seal or a chemical seal. A physical seal including, but not limited to, an adhesive tape, sealing putty, or a form-fit seal. A chemical seal including, but not limited to, a silicone, polyurethane, epoxy, or liquid rubber. The seal may also encapsulate the entire power compartment 116, base portion 106, and recessed portion 107. The seal may also encapsulate at least a portion of the ornamental component/luminous pad unit 108. The seal may be waterproof so that the power component 116, receptacle 118, electrical wire 119, switch 120, and any additional componentry 125 may be submerged in water for several hours.

The ornamental component/luminous pad unit 108, power component 116, receptacle 118, electrical wire 119, switch 120, and additional componentry 125 may also be individually, or collectively waterproofed or water resistant such that the individual components may be submerged in water for several hours.

In certain embodiments, the ornamental component/luminous pad unit 108 may be configured to contain one or more of the luminous pad 110, the ornamental component 112, and/or the power compartment 116. In certain embodiments, the power compartment 116 may be secured to the ornamental component 112 and/or luminous pad 110 via a shielded electrical wire connected to a power source of the power compartment 116 and to the circuitry of the luminous pad 110 and/or ornamental component 112. In certain embodiments, the ornamental component 112 may be fastened (e.g., via an adhesive or other securing mechanism) to the luminous pad 110 and may have a size and dimension that is smaller than the luminous pad such that a portion of the luminous pad 110 extends beyond the outer edges of the ornamental component 112. The luminous pad 110 and/or the ornamental component 112 may have any number of light-emitting componentry contained therein. For example, the luminous pad 110 and/or ornamental component 112 may include any number of light emitting diodes, chemically luminescent substances, bulbs, and/or other such componentry. The luminous pad 110 may include polyethylene terephthalate, polyvinyl chloride, translucent plastic, a fluorophore, an ester, an electron-rich dye, or a combination thereof. The ornamental component 112 may include a volume which may be configured to house a portion of the electrical wire 119, lights, and/or additional componentry 125.

The power compartment 116 may include a receptacle 118 (and accompanying cover) within which a power source, such as a battery may be housed. The power source may be utilized to deliver power to the luminous pad 110 and/or ornamental component 112 to activate lights. In certain embodiments, the power source may be an alkaline battery, a rechargeable battery, a lithium ion battery, a button cell battery, any type of power source, or a combination thereof. The power compartment 116 may also include a switch 120, which may be configured to activate the luminous bottle 100 and deliver power from the power source to the lights of the luminous pad 110 and/or ornamental component 112. In certain embodiments, the switch 120 may be pressed and secured into a depressed position. In such embodiments, light may be emitted by the luminous pad 110 (and/or other componentry) for as long as the switch 120 is in the depressed position. In certain embodiments, instead of securing the switch 120 into the depressed position, the switch 120 may be toggled back and forth by a user so that the switch 102 deactivates and reactivates the power from the power source to causing emission of light in accordance with the deactivation and reactivation. For example, if the switch 120 is toggled back and forth repeatedly in a sequence, the light emitted may flash in sequence with the toggling so that the flashing may be perceived by a user.

Still further, the luminous bottle may include additional componentry 125. As described in more detail below, the additional componentry may include, but is not limited to, additional power sources, sensors, memories, processors, communication modules, circuitry, LED engine, and/or other componentry. For example, any type of sensor may be utilized. A light sensor may be configured to detect ambient light in an environment within which the luminous bottle 100 is located. In certain embodiments, the luminous pad 110 may be configured to adjust an intensity of the light emitted based on the ambient light detected in the environment. As another example, an acoustic sensor may be configured to detect an audio signal associated with audio content occurring in the environment. When the audio signal is detected by the sensor and the switch of the power compartment 116 is activated, the light may be emitted in a manner in accordance with a rhythm, a beat, a command, or a combination hereof, associated with the audio content. As another example, a temperature sensor may be configured to detect ambient heat or the heat of the luminous bottle 100. Similarly, other types of sensors and functionality may be incorporated into the bottle. For example, motion sensors, substance level sensors, accelerometers, gyroscopes, pressure sensors, moisture detection sensors, and/or any other sensors may be incorporated and utilized to adjust the emission of light and/or trigger emission of light.

A LED engine may be utilized to change the colors of light being emitted from the luminous pad 110. The LED engine may be controlled by the switch 120. Alternatively, the switch 120 may control what setting the LED engine is configured to. For instance, a setting that displays a single color, a color shifting setting, a color strobe setting, acoustic setting, ambient light detecting setting, acoustic detecting setting, temperature detecting setting, and off setting. The light detecting, acoustic detecting, and temperature detecting settings may be reactive to environmental changes.

The additional componentry 125 may include at least one light sensor. The light sensor configured to periodically observe the ambient light around the luminous bottle 100. The light sensor may be configured to observe strobing lights and send a signal to the luminous pad 110 to mimic the strobing light pattern. The light sensor may be configured to detect changes in color of light and send signals to the luminous pad 110 to mimic the light detected, emit a complementary color of the light detected, or emit a random light color. The light sensor may be capable of detecting the intensity of ambient light and send a signal to the luminous pad 110 to match the intensity of light, emit a light intensity inversely proportional to the detected ambient light, emit a random light intensity.

The additional componentry 125 may include at least one acoustic sensor. The acoustic sensor configured to periodically observe the ambient sound around the luminous bottle 100. The acoustic sensor may be configured to observe ambient sound and determine if music is in the ambient sound. The acoustic sensor may be configured to send signals to the luminous pad 110 to change the emitted colors. The acoustic sensor may send signals to the luminous pad 110 to change emitted colors in response to the change of the ambient sound, such as changing colors in cadence with the rhythm of the ambient music.

The at least one acoustic sensor may include several sensors for observing ambient music. The sensors may be configured to observe the bass, treble, tonality, timbre, texture, rhythm, melody, harmony, form, and dynamics of the ambient music. The acoustic sensor may be configured to send signals to a processor. The processor may be able to process the acoustic information and send signals to the luminous pad 110 to emit light in reaction to the ambient music.

The additional componentry 125 may include at least one thermal sensor. The thermal sensor configured to periodically observe the ambient temperature around the luminous bottle 100 or the ambient temperature of the luminous bottle 100. The thermal sensor may periodically observe the ambient temperature around the luminous bottle 100 and send signals to the luminous pad 110 to emit a corresponding or random light. The thermal sensor may be configured to periodically observe the temperature of the luminous bottle 100 and send a signal to the luminous pad 110 to produce a corresponding color indicating the bottles temperature. For instance, if the luminous bottle is hot a red color is emitted; if the luminous bottle is cold a light blue color is emitted; if the bottle is at an ideal temperature then a white color is emitted.

The additional componentry 125 may include any combination of the at least one light sensor, acoustic sensor, and thermal sensor. The sensors may be configured to periodically observe the ambient environment around the luminous bottle 100. The sensors may work in tandem or individual. For instance, the light sensor may determine the intensity of the emitted light, the acoustic sensor may determine the cadence of the light changing, and the temperature sensor may determine the color of the light.

The additional componentry 125 may include a clock. The clock configured to periodically send signals to the luminous pad 110. The signals form the clock may be configured to change the color of light emitted from the luminous pad 110. The signals form the clock may be configured to change the intensity of light emitted from the luminous pad 110. The clock may be configured to work in combination of the any of the at least one light sensor, acoustic sensor, and thermal sensor.

Although FIGS. 1-9 illustrates specific example configurations of the various components of the luminous bottle 100, the luminous bottle 100 may include any configuration of the components, which may include using a greater or lesser number of the components. For example, the bottle 100 is illustratively shown as including an opening 102, a front portion 103, a volume 104, a back portion 105, a base portion 106, a recessed portion 107, an ornamental component/luminous pad unit 108, a luminous pad 110, an ornamental component 112, a power compartment 116, a receptacle 118 for housing a power source, an electrical wire 119, a switch 120, and/or any number of additional componentry 125. However, the luminous bottle 100 may include multiple openings 102, multiple volumes 104, multiple recessed portions 107, multiple ornamental component/luminous pad units 108, multiple luminous pads 110, multiple ornamental component 112, multiple power compartments 116, multiple receptacles 118 for housing a power source(s), multiple electrical wires 119, multiple switches 120, any number of additional componentry 125, and/or any other features or componentry.

Notably, the present disclosure also contemplates a method 1000 for utilizing the luminous bottle 100. The method 1000 may further incorporate any of the features and functionality described for the luminous bottle 100, any other method disclosed herein, or as otherwise described herein. The method 1000 may include, at step 1002, providing a luminous bottle 100 containing a consumable beverage for consumption of a user/consumer. For example, the consumable beverage may be champagne, wine, liquor, beer, soda, water, and/or any other type of substance that is consumable. At step 1004, the method 1000 may include activating a switch 120 of the luminous bottle 100 to deliver power to a luminous pad 110 of the luminous bottle 100. In certain embodiments, the luminous pad 110 may have attached thereon an ornamental component 112, which may be configured to have a general shape or outline correlating with a shape or outline of the luminous pad 110. For example, the ornamental component 112 may be formed in the shape of a chess piece (e.g., a king piece as shown in the Figures) and the luminous pad 110 on which the ornamental component 112 is attached may have a general shape correlating with the shape of the ornamental component 112.

After the switch 120 is activated, power from the power compartment 116 of the luminous bottle 100 may be delivered to the luminous pad 110 via a shield electrical wire 119 so that, at step 1006, light may be outputted or emitted via the luminous pad 110 to illuminate a portion of the bottle 100. For example, if the luminous pad 110 is shaped like a king chess piece and the ornamental component 112 is similarly shaped like a king chess piece, but smaller in size, the light emitting from the luminous pad 110 may give a visual halo effect in chess piece form that is attractive to a consumer. When the consumer is done using the luminous bottle 100 or at any other desired time, the method 1000 may proceed to step 1008, which may include deactivating the switch of the luminous bottle 100. At step 1010, the method 1000 may include ceasing output of the light via the luminous pad of the luminous bottle now that the switch 120 has been deactivated. The method 1000 may be repeated as desired and may incorporate any of the features and/or functionality as described in the present disclosure.

Figure 11:
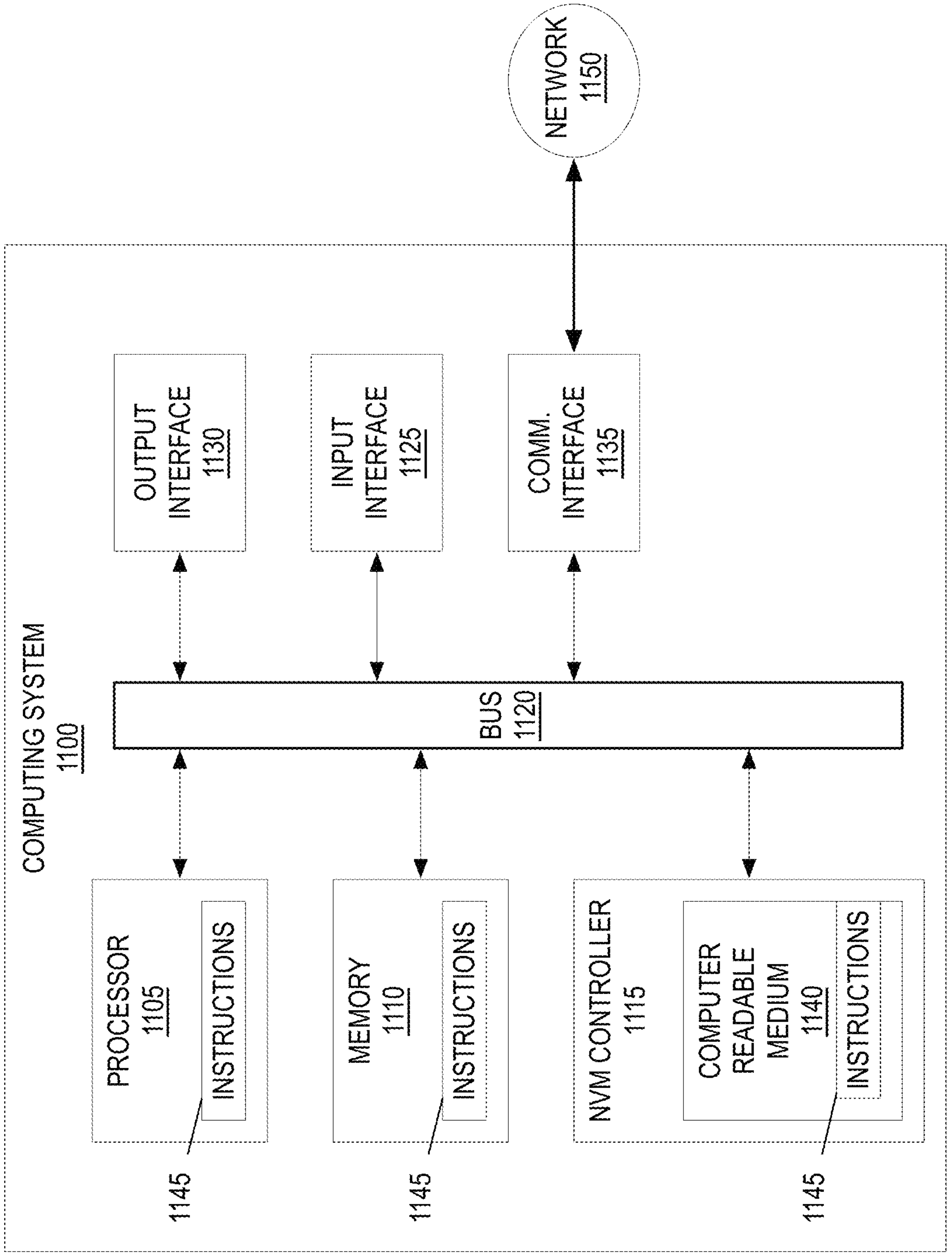
FIG. 11 illustrates a computing system that can form part of or correspond to componentry of the luminous bottle according to an embodiment of the present disclosure.

FIG. 11 illustrates an example of a computing system 1100 that can form a part of or correspond to the additional componentry 125, and that can be configured to implement alone or in combination with any of the other components described above the various operations described above. As shown, subcomponents of the computing system 1100 include a processor 1105, a memory 1110, a non-volatile memory controller 1115, an output interface 1130, an input interface 1125, a communication interface 1135, and a bus 1120 that facilitates communications between these subcomponents. An example of the computing system 1100 can operate as a stand-alone device or can be connected, e.g., using a network, to other computing systems or peripheral devices.

Some examples of the input interface 1125 facilitate receiving information from peripherals outside of the computing system 1100. For instance, some examples of the input interface 1125 facilitate receiving signals/information from the above described, switch 120, light sensors, acoustic sensors, motion sensors, substance level sensors, accelerometers, gyroscopes, pressure sensors, moisture detection sensors, thermal sensors, etc. Some examples of the output interface 1130 facilitate activating and deactivating peripherals outside of the computing system 1100. For instance, some examples of the output interface 1130 facilitate outputting signals to the above-described LEDs of the luminous pad 110. Some examples of the output interface 1130 can facilitate outputting signals to other output devices such as speakers, haptic devices, etc.

Some examples of the communication interface 1135 facilitate communications via a network 1150. The network 1150 can include wired networks, wireless networks, or combinations thereof. The communication interface 1135 can facilitate communications via any number of wireless broadband communication standards (e.g., WiFi, Bluetooth®, etc.). For instance, some examples of the computing system 1100 are configured to receive and/or transmit, via the communication interface, information that facilitates controlling the operations performed by the computing system 1100 or a different computing system 1100 and/or for updating information (e.g., instruction code) in the computing system.

Some examples of the processor 1105 correspond to an Arm®, Intel®, etc., based processor. Some examples of the memory 1110 store instructions 1145 that are executable by the processor 1105 to cause the computing system 1100 to perform any of the operations described above. The memory 1110 can be random-access memory, read-only memory, programmable memory, or any other type of memory or storage device. In addition to the operations described above, some examples of the instruction code implement an operating system such as Linux®, Windows®, or a different operating system. In this regard, some examples of the non-volatile memory (NVM) controller 1115 include a computer-readable medium 1140 (e.g., flash drive) in which the instructions 1145 are stored. In some examples, the instructions 1145 are at least partially transferred to the memory 1110 for execution by the processor 1105.

Some examples of the memory 1110 and/or the computer-readable medium 1140 store instruction code that causes the computing system 1100 to implement the above-described LED engine. For example, the instruction code causes the computing system 1100 to control, via the output interface 1130, one or more LEDs to change the color(s) of light being emitted from the luminous pad 110. Some examples of the instruction code cause the computing system 1100 to cause these and/or other operations to be performed in response to indications received via the input interface 1125 from one or more sensors, switches, etc. For instance, in some examples, the instruction code executed by the computing system 1100 causes the computing system 1100 to control the colors and/or intensities of light being emitted from the luminous pad 110 to change (e.g., display a single color, display a color pattern, etc.) in response to changes in the ambient environment (e.g., ambient sound, light, temperature, etc.) that are sensed via the various sensors described above.

In some examples, the luminous pad 110 may be controlled to output a strobing light pattern that mimics the pattern of a strobing light sensed in the environment, to emit a complementary color of the light sensed in the environment, etc. In some examples, the luminous pad 110 may be controlled to output a light pattern that mimics an audio pattern sensed in the environment (e.g., the rhythm of a song). In some examples, the luminous pad 110 may be controlled to output a light pattern that changes as a function of the ambient temperature (e.g., change to red when hot, light blue when cold, etc.). The luminous pad 110 may be controlled to output a light pattern according to any of the other techniques described herein.

In some examples, the luminous pad 110 is controlled to emit light based on an indication received via the communication interface 1135. For instance, a wireless signal can be received by a group of luminous bottles 100 that causes respective luminous pads 110 of the luminous bottles 100 to strobe in a particular sequence. For example, the luminous pads 110 may strobe light in unison or in a particular order (e.g., first luminous pad 110 for 500 ms, second luminous pad 110 for 500 ms, etc.) In some examples, the wireless signal is communicated from a centralized controller (e.g., a computer in a business establishment). In some examples, the wireless signal is communicated from a designated master device (e.g., a particular luminous bottle 100), and the other luminous bottles 100 can be designated as slave devices that respond to the master signal.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A luminous bottle, comprising:

a volume configured to receive a consumable beverage;

a securable opening located on a portion of the luminous bottle, wherein the consumable beverage is pourable through the opening such that the consumable beverage is contained within the volume of the luminous bottle;

a base portion;

a luminous pad configured to communicate with a surface of the luminous bottle and configured to output light, where the luminous pad includes all light emitting components;

an ornamental component configured to communicate with a portion of the luminous pad, wherein the ornamental component is non-transparent, and wherein, from a view from a front of the luminous bottle, the luminous pad is configured to emit an illuminated outline of the ornamental component;

a power compartment that includes a power source configured to deliver power to the luminous pad such that when a switch is activated, the luminous pad emits light.

2. A luminous bottle, comprising:

a volume configured to receive a consumable beverage;

a securable opening located on a portion of the luminous bottle, wherein the consumable beverage is pourable through the opening such that the consumable beverage is contained within the volume of the luminous bottle;

a luminous pad configured to communicate with a surface of the luminous bottle and configured to output light;

an ornamental component configured to communicate with a portion of the luminous pad;

a power compartment that includes a power source configured to deliver power to the light emitting components such that when a switch is activated, the luminous pad emits light;

wherein the power compartment includes an electrical wire connected to the power source, wherein the electrical wire is configured to connect with the luminous pad at a location behind a back portion of the ornamental component, wherein the electrical wire is concealed from view from a top and sides of the luminous bottle.

3. The luminous bottle of claim 1, wherein the light emitting components of the luminous pad comprise a light emitting diode, polyethylene terephthalate, polyvinyl chloride, translucent plastic, a fluorophore, an ester, an electron-rich dye, or a combination thereof.

4. The luminous bottle of claim 1, wherein the switch is configured to be deactivated, and wherein when the switch is deactivated, the luminous pad ceases to emit the light.

5. A luminous bottle, comprising:

a volume configured to receive a consumable beverage;

a securable opening located on a portion of the luminous bottle, wherein the consumable beverage is pourable through the opening such that the consumable beverage is contained within the volume of the luminous bottle;

a luminous pad configured to communicate with a surface of the luminous bottle and configured to output light;

an ornamental component configured to communicate with a portion of the luminous pad;

a power compartment that includes a power source configured to deliver power to the light emitting components such that when a switch is activated, the luminous pad emits light;

wherein the switch is configured to be pressed repeatedly in a sequence such that the light is emitted in accordance with the sequence.

6. The luminous bottle of claim 1, wherein the luminous pad further comprises a light emitting diode configured to change color.

7. The luminous bottle of claim 1, wherein the ornamental component is configured to be replaced with a different ornamental component.

8. The luminous bottle of claim 1, wherein the luminous pad is configured to be replaced with a different luminous pad having a different shape, a different thickness, a different type of light, or a combination thereof.

9. The luminous bottle of claim 1, wherein the ornamental component is configured to be detached from the luminous pad.

10. The luminous bottle of claim 1, wherein the luminous pad, the power compartment, and the ornamental component are attachable or detachable from the luminous bottle as a connected unit.

11. A computerized method, comprising:

providing a luminous bottle containing a consumable beverage for consumption by a user;

receiving, at an acoustic, visual or thermal sensor of the luminous bottle, a respective ambient condition exceeding a threshold set in memory;

activating, by a processor, a switch of the luminous bottle to deliver power to a luminous pad of the bottle;

outputting light via the luminous pad of the luminous bottle to illuminate an outline of an ornamental component of the luminous bottle, wherein a degree of illumination is set by the processor dependent upon a degree of ambient condition sensed.

12. A bottle, comprising:

a securable opening located on a portion of the bottle, wherein a consumable beverage is pourable through the opening such that the consumable beverage is contained within a volume of the bottle;

a luminous pad configured to adhere to a surface of the bottle and configured to output light;

an ornamental component attachable to a portion of the luminous pad, wherein the ornamental component is sized smaller than the luminous pad, at least about a top and sides thereof, such that a portion of the luminous pad extends beyond the outer edges of the ornamental component, creating an outline around the ornamental component;

a power compartment that includes a power source configured to deliver power to the luminous pad such that when a switch is activated, the luminous pad emits light, illuminating the outline around the ornamental component.

13. The bottle of claim 12, wherein the luminous pad and the ornamental component are similarly shaped as a king chess piece, and wherein the illuminated outline around the ornamental component creates a visual halo effect around the ornamental component.

14. The luminous bottle of claim 1, wherein the base portion includes a recessed portion, and wherein the power compartment is configured to secure within the recessed portion.

15. A luminous bottle, comprising:

a volume configured to receive a consumable beverage;

a securable opening located on a portion of the luminous bottle, wherein the consumable beverage is pourable through the opening such that the consumable beverage is contained within the volume of the luminous bottle when the consumable beverage is poured through the opening;

a base portion including a recessed portion;

a luminous pad configured to adhere to a surface of the luminous bottle and configured to output light;

an ornamental component attachable to the luminous bottle and configured to secure onto a portion of the luminous pad; and a power compartment configured to secure within the recessed portion, wherein the power compartment includes a power source configured to deliver power to the luminous pad such that when a switch of the power compartment is activated, the luminous pad emits light;

wherein the ornamental component is configured to house an additional power source.

16. The bottle of claim 1, wherein one or both of the luminous pad and the ornamental component are shaped as a chess piece.

17. The bottle of claim 12, wherein one or both of the luminous pad and the ornamental component are shaped as a chess piece.

18. An illumination kit for releasable attachment to a bottle, so to provide an illuminating quality to the bottle, the illumination kit comprising:

a luminous pad configured to communicate with a surface of a bottle and configured to output light;

an ornamental component configured to communicate with at least a portion of the luminous pad;

a power compartment that includes a power source configured to deliver power to light emitting components of the luminous pad; such that when a switch is activated, the luminous pad emits light;

an acoustic, visual or thermal sensor configured to sense a respective ambient condition;

a processor configured to:

receive a signal from the sensor;

determine whether the ambient condition satisfies a threshold set in memory; and activate power delivery to the light emitting components of the luminous pad if the ambient condition satisfies the threshold, wherein a degree of illumination is set by the processor dependent upon a degree of the ambient condition sensed.

19. An illumination kit for releasable attachment to a bottle, so to provide an illuminating quality to the bottle, the illumination kit comprising:

a luminous pad configured to communicate with a surface of a bottle and configured to output light;

an ornamental component configured to communicate with at least a portion of the luminous pad; wherein the ornamental component is sized smaller than the luminous pad, at least about a top and sides thereof, such that a portion of the luminous pad extends beyond the outer edges of the ornamental component, creating an outline around the ornamental component;

a power compartment that includes a power source configured to deliver power to the luminous pad to emit light and illuminate the outline around the ornamental component.

20. The illumination kit of claim 19, wherein at least the ornamental component is shaped as a chess piece.

* * * * *